US012744367B1

(12) United States Patent
Ko

(10) Patent No.: US 12,744,367 B1
(45) Date of Patent: Sep. 22, 2026

(54) OUTLET ASSEMBLY WITH POWERED COVER PLATE

(71) Applicant: Lawrence Ko, Rowland Heights, CA (US)

(72) Inventor: Lawrence Ko, Rowland Heights, CA (US)

(*) Notice: Subject to any disclaimer, the term of this patent is extended or adjusted under 35 U.S.C. 154(b) by 0 days.

(21) Appl. No.: 19/408,433

(22) Filed: Dec. 4, 2025

(51) Int. Cl.
*H02G 3/14* (2006.01)
*F21V 33/00* (2006.01)
*H02G 3/08* (2006.01)
*F21Y 115/10* (2016.01)

(52) U.S. Cl.
CPC ............. *H02G 3/14* (2013.01); *F21V 33/006* (2013.01); *H02G 3/081* (2013.01); *F21Y 2115/10* (2016.08)

(58) Field of Classification Search
CPC ........ H02G 3/14; H02G 3/081; F21V 33/006; F21Y 2115/10
See application file for complete search history.

(56) References Cited

U.S. PATENT DOCUMENTS

| | | | | |
|---|---|---|---|---|
| 8,393,747 B2 * | 3/2013 | Kevelos | H01H 13/83 | 362/558 |
| 2003/0092297 A1 * | 5/2003 | Reindle | H01R 31/02 | 439/107 |
| 2010/0261374 A1 * | 10/2010 | Hung | H01R 31/065 | 439/535 |
| 2019/0348829 A1 * | 11/2019 | Davis | H01H 9/08 | |
| 2023/0318222 A1 * | 10/2023 | Ko | H05K 5/0047 | 439/55 |

* cited by examiner

*Primary Examiner* — Evan P Dzierzynski
(74) *Attorney, Agent, or Firm* — Plager Schack LLP; Mark H. Plager; Robert Kelley Roth

(57) ABSTRACT

An outlet assembly is supplied electricity from a power source and has an in-wall unit electrically connected to the power source, an outlet electrically connected to the in-wall unit, and a cover plate including a front cover, a rear cover, and a printed circuit board, wherein the printed circuit board is electrically connected the in-wall unit, and at least one LED mounted on the printed circuit board.

10 Claims, 6 Drawing Sheets

OUTLET ASSEMBLY WITH POWERED COVER PLATE

BACKGROUND OF THE INVENTION

The present disclosure relates generally to electrical outlet assemblies. Electrical outlet assemblies are used to provide electricity at convenient locations. Typically, such outlet assemblies have an outlet positioned on a wall, adapted to receive a plug from an electrical appliance, and can be provided with a cover plate. Known cover plates are typically not electrically conductive. It would be desirable to provide a cover plate which is at least partially electrically conductive, while still maintaining safety.

SUMMARY OF THE INVENTION

In accordance with a first aspect, an outlet assembly is supplied electricity from a power source and has an in-wall unit electrically connected to the power source, an outlet electrically connected to the in-wall unit, and a cover plate comprising a front cover, a rear cover and a printed circuit board, wherein the printed circuit board is electrically connected the in-wall unit, and optional MCU, LED, and/or sensors mounted on the printed circuit board.

BRIEF DESCRIPTION OF THE DRAWINGS

The detailed description of some embodiments of the present disclosure is made below with reference to the accompanying figures, wherein like numbers represent corresponding parts of the figures.

DETAILED DESCRIPTION OF CERTAIN EMBODIMENTS

In the following detailed description of the invention, numerous details, examples, and embodiments of the invention are described. However, it will be clear to those skilled in the art that the invention disclosed herein is not limited to the embodiments set forth and that the invention can be adapted for any of several applications. This list of possible constituent elements is intended to be exemplary only, and it is not intended that this list be used to limit the present application to just these elements. Persons having ordinary skill in the art given the present disclosure, may understand there to be equivalent elements that may be substituted within the present disclosure without changing the essential function or operation of the device. The various elements of the device of the present disclosure may be related in the following exemplary fashion. It is not intended to limit the scope or nature of the relationships between the various elements and the following examples are presented as illustrative examples only.

Figure 1:
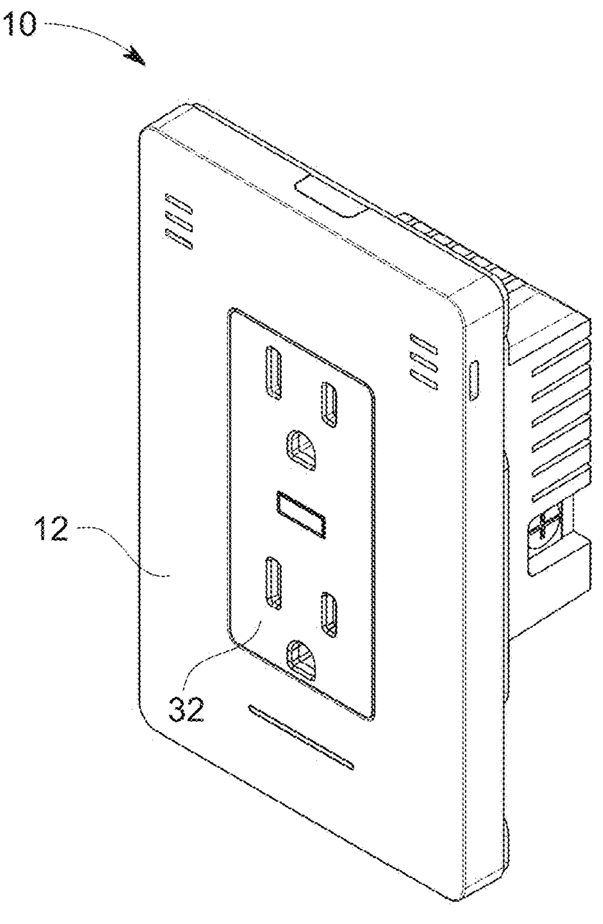
FIG. 1 is an isometric view of an outlet assembly in accordance with one embodiment.
Figure 2:
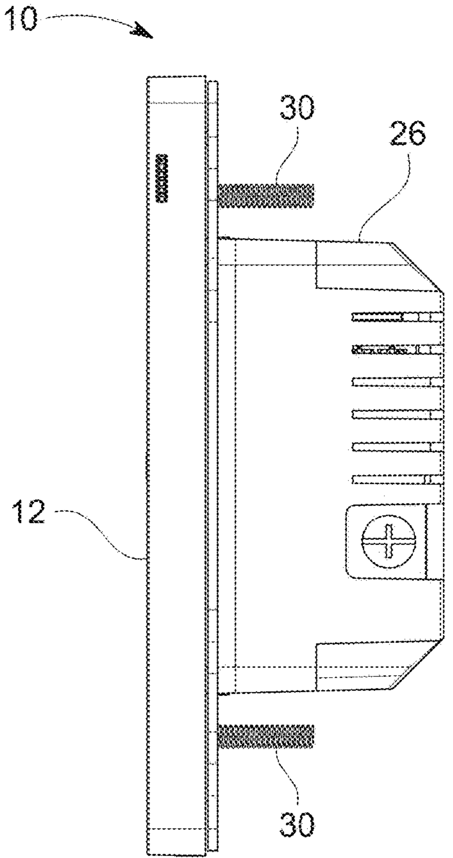
FIG. 2 is a side view of the outlet assembly of FIG. 1.

Turning now to the drawings, FIG. 1 shows an outlet assembly 10 adapted to be mounted in a wall and electrically connected to a power source, front cover 12 of a cover plate, and an in-wall unit 22 with openings adapted to receive a plug of an electrical appliance. The front cover can extend circumferentially around the outlet, as shown. Typically, the front cover 12 of the cover plate is made of an insulating, non-electrically conductive material, and is at least partially translucent. FIG. 2 is a side view of the outlet assembly 10 with the outlet secured to a housing 26 of the in-wall unit via fasteners 30 and front cover 12 of the cover plate facing away from the in-wall unit housing.

Figure 3:
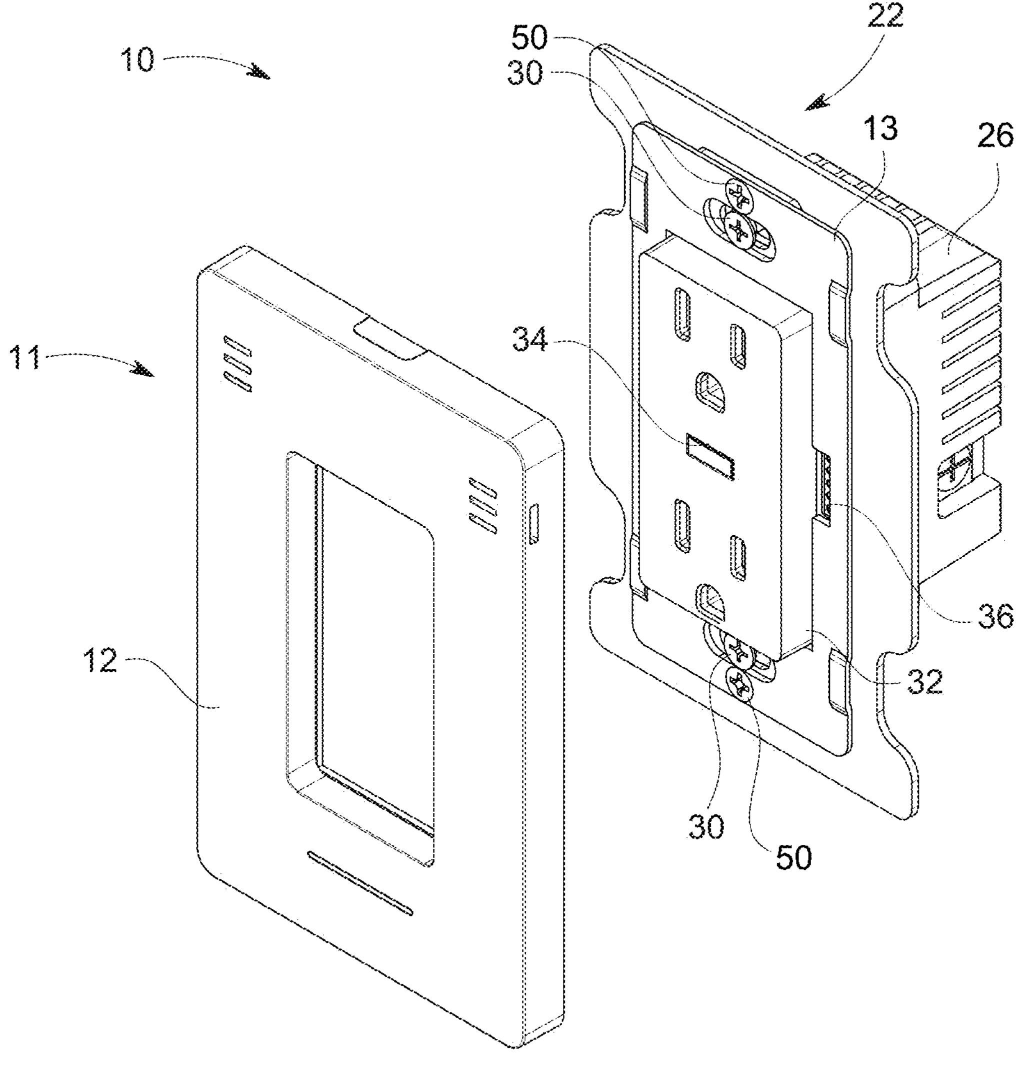
FIG. 3 is a partially exploded isometric view of the outlet assembly of FIG. 1, with the cover plate separated.

FIG. 3 shows the outlet assembly 10 formed from a cover plate having front cover 12 and an in-wall assembly formed with outlet 32. The cover plate assembly 11 is formed of the front cover 12, printed circuit board 14 and back cover 16. The printed circuit board is electrically connected to the in-wall unit 22 as described in greater detail below, while the front cover 12 and back cover 16 are made of non-conducting materials. The front cover 12 extends circumferentially around the in-wall unit 22 when assembled. Fasteners 30 are used to secure the in-wall unit 22 to the electrical box on the wall. An intermediate metal sheet/bracket 13 is screwed onto in-wall unit 22 via screw 50, which the back cover 16 is snapped onto intermediate metal sheet 13 via the snaps designed on back cover 16, so that the cover plate assembly 11 is securely fixed on the in-wall unit 22 on the wall. Rear housing 26 of the in-wall unit 22 is operatively connected to the rest to the in-wall unit 22. Pogo pin connector 36 may be provided on the in-wall unit 22. The pogo pin is designed to connect with another pogo pin on a cover plate printed circuit board 14. The male pogo pin connector 17 is a spring-loaded connector designed to receive a female pogo pin, which has a spring-loaded plunger. The female connector cooperates with the male connector to create a stable, reliable electrical connection between the in-wall unit and the printed circuit board 14 of the cover plate as discussed in more detail below. A center button 34 on the electrical outlet 32 is used as a reset or control button and serves as a system feature designed to for smart functionality.

Figure 4:
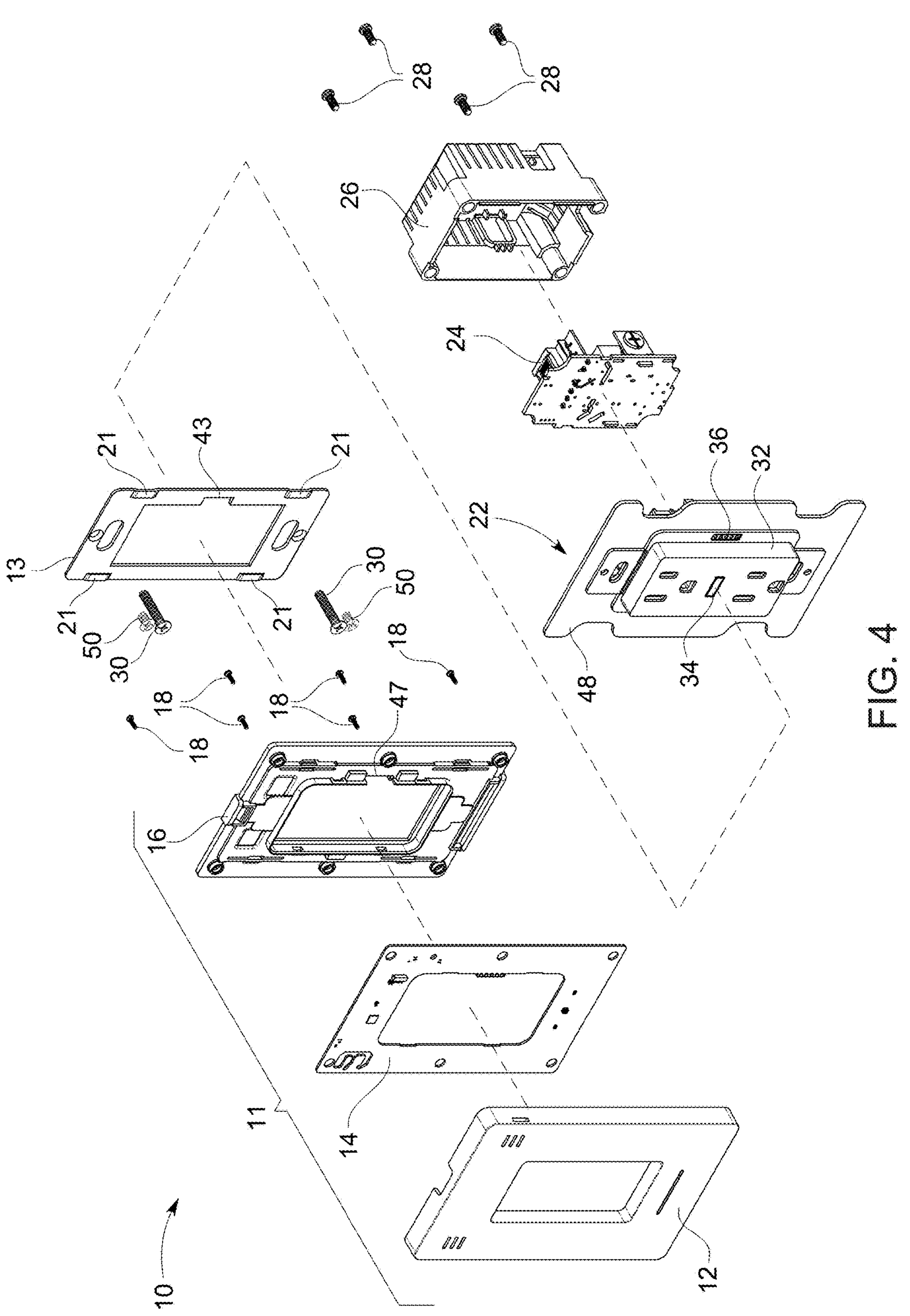
FIG. 4 is an exploded isometric view of the outlet assembly of FIG. 1, showing the cover plate and in-wall unit.
Figure 5:
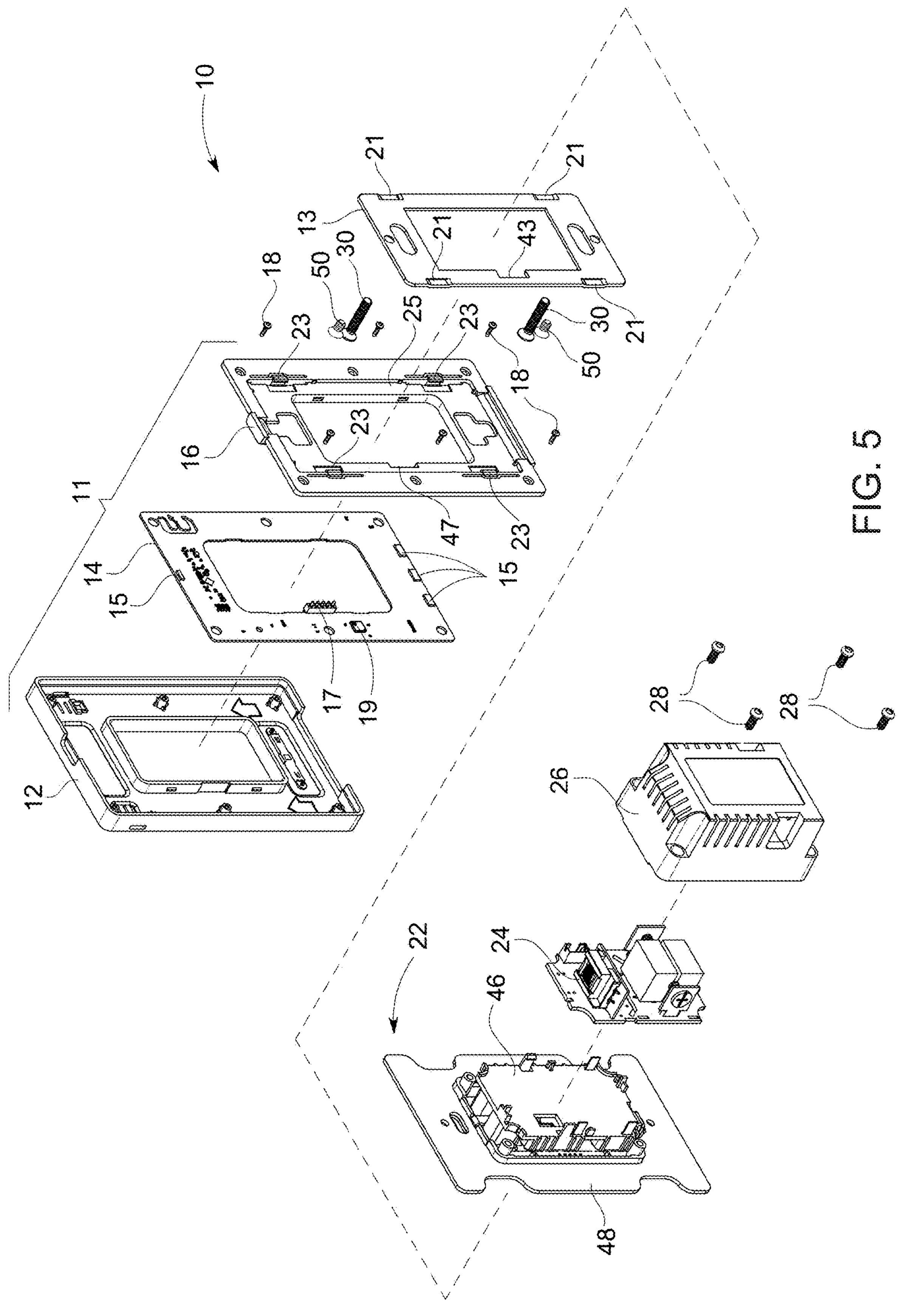
FIG. 5 is an exploded isometric rear view of the outlet assembly of FIG. 4.

FIGS. 4 and 5 show opposite side exploded isometric views of the outlet assembly 10 comprising cover plate assembly 11 and in-wall unit 22. The cover plate assembly 11 comprises the front cover 12, printed circuit board 14, and back cover 16. The in-wall unit 22 comprises outlet 32, in-wall unit plate 48, in-wall unit printed circuit board 24, and rear housing 26. In FIG. 4, a bracket 13 is shown. The bracket 13 operatively connects the cover plate assembly 11 to the in-wall unit 22. These elements can be connected together in one of several ways. In accordance with a highly advantageous element, the bracket 13 can be affixed to the in-wall unit plate 48 via screws 50, and the back cover 16 may be connected by snap fit to the bracket 13. Separate fasteners 30 may also secure the in-wall unit 22 to the electrical box on the wall. Typically, the back cover 16 and/or the bracket 13 has a resiliently deformable flange which allows for the snap fit connection. In the embodiment of FIGS. 4 and 5, tabs 21 (shown in FIG. 4) operatively engage elements 23 (shown in FIG. 5) via a snap fit to secure the back cover 16 to the bracket 13. Fasteners/screws 18 may be used to secure the back cover 16 to the printed circuit board 14 and to the front cover 12. Fasteners 28 may be used to secure the rear housing 26 to the in-wall unit front cover. In-wall unit plate 48 is secured on the in-wall unit 22 via screws 50, where the ground yoke 40 is sandwiched in between the bracket 13 and in-wall unit plate 48. In-wall unit plate 48 is designed to avoid in-wall unit 22 from being overly flush on the wall.

Figure 6:
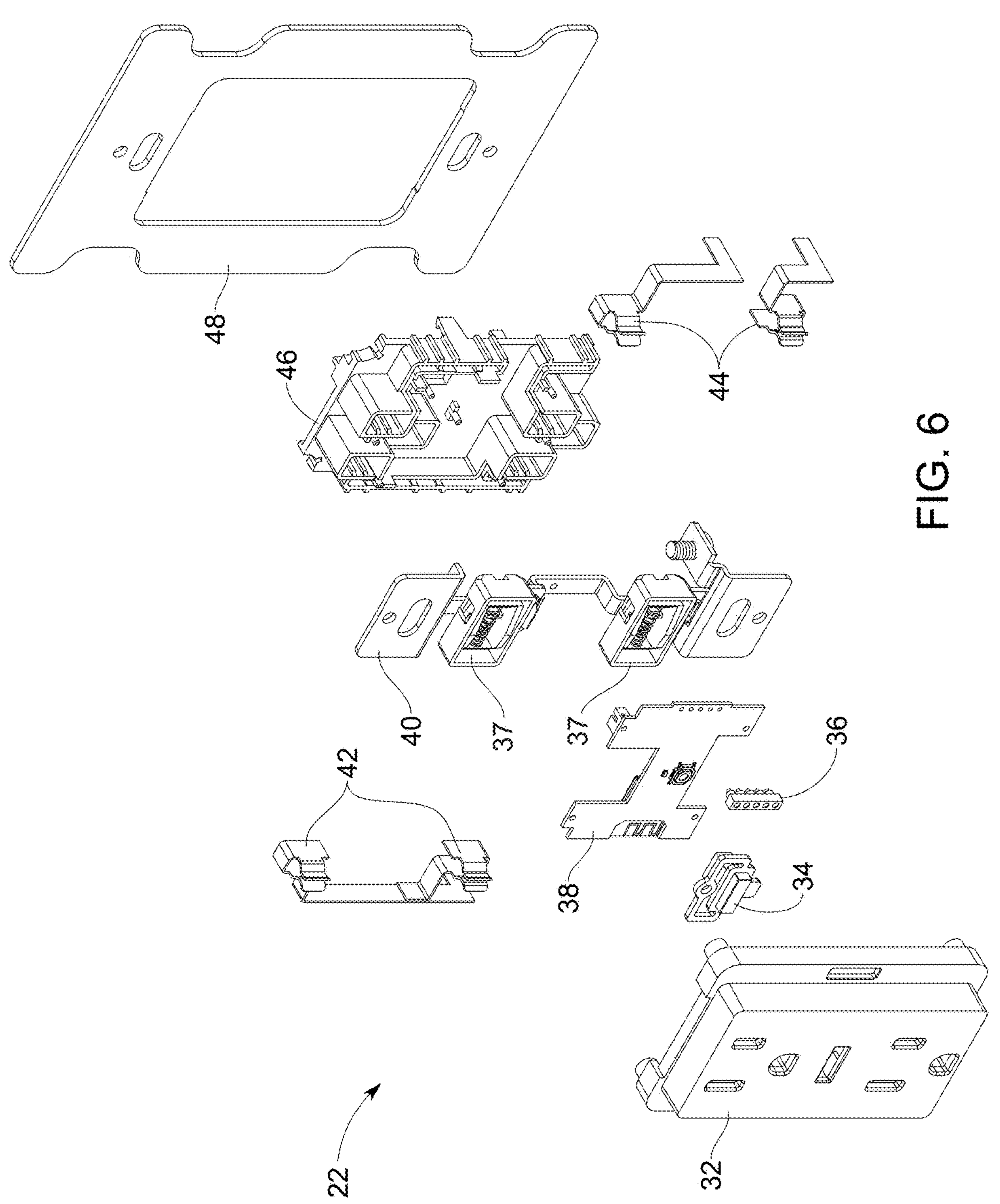
FIG. 6 is an isolated, exploded isometric view of the in-wall unit.
Figure 7:
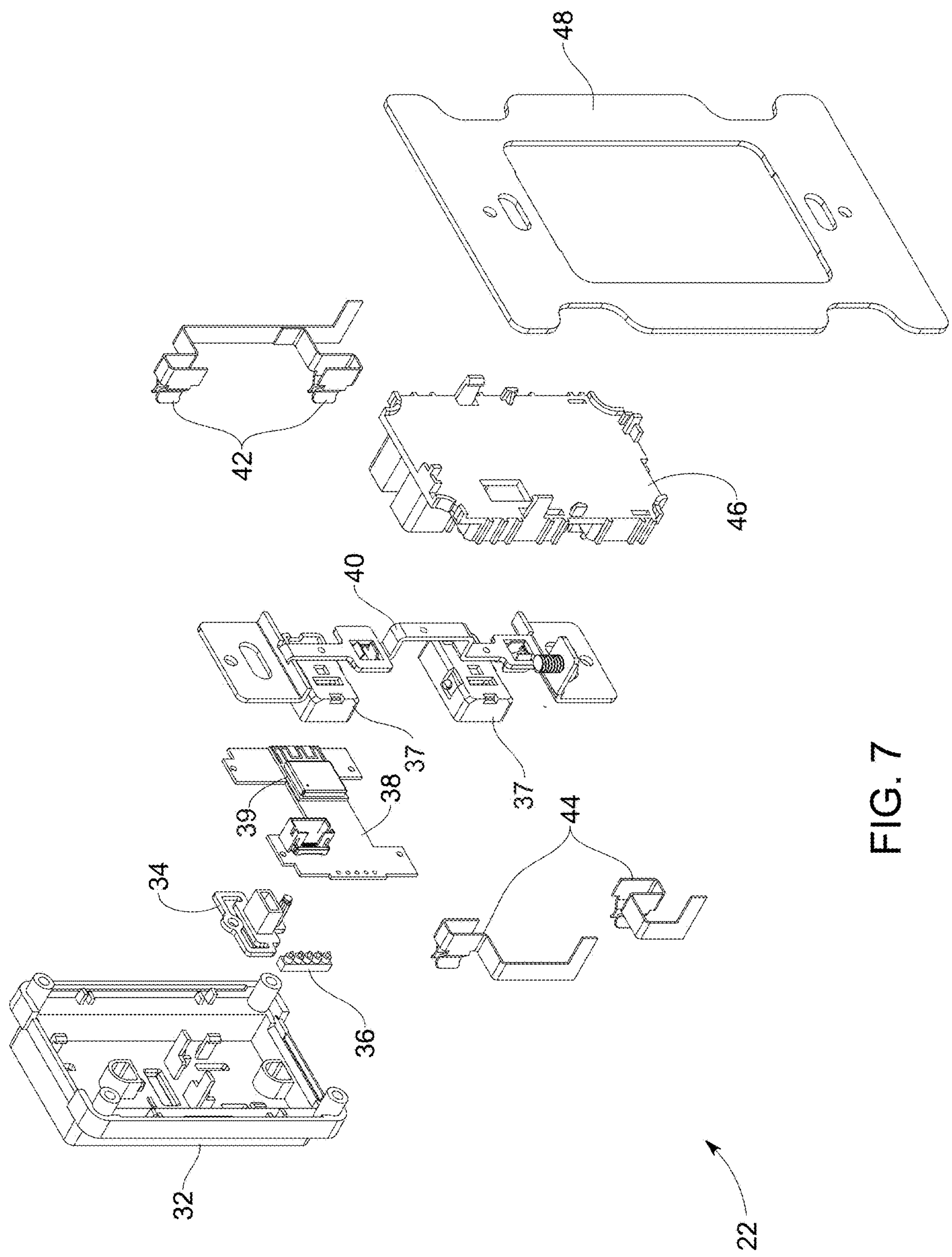
FIG. 7 is an exploded, isolated, isometric rear view of the in-wall unit of FIG. 6.

In-wall unit 22 is electrically connected to the printed circuit board 14 of the cover plate. The in-wall unit typically produces a relatively low DC voltage and has a pogo pin connector 36 (shown in FIG. 4), which may be mounted on the in-wall unit front cover, for example, and electrically connected to a pogo pin connector 17 on the printed circuit board 14 (shown in FIG. 5). The bracket 13 may be provided with a cutaway section 43, and the back cover 16 may be provided with a cutaway section 47, with each cutaway section allowing for connection of pogo pin connectors 36 and 17. Also, the printed circuit board 14 and the back cover 16 are provided with a central opening allowing for the outlet 32 to extend through and past the front cover 12. The printed circuit board 14 and the back cover 16 may circumferentially surround the outlet 32 when assembled. In accordance with a highly advantageous element, FIG. 5 shows one or more LEDs 15 may be mounted on the printed circuit board 14 to act as a nightlight. Optionally, the LEDs may be mounted on a side of the printed circuit board 14 facing away from the front cover, i.e., a rear side. Such an arrangement provides some diffusion of the light emitted by the LEDs. Electrical connection of the printed circuit board 14 of the cover plate with the in-wall unit printed circuit board 24 can allow for a so-called smart outlet with smart cover plate assembly, where power to the outlet and the LEDs may be controlled via an application on wall-mounted control panel or a phone, for example. Optionally, at least one microcontroller unit (MCU) can be mounted on the cover plate assembly printed circuit board. FIG. 5 shows chip 19 operatively connected to the cover plate printed circuit board for communication with such other elements (wall-mounted panel, app on a phone, etc.). Such connection can be via wired assembly or via wireless communication (such as by use of an inductive coupler allowing for wireless electrical connection between the in-wall unit and the cover plate assembly). FIGS. 6 and 7 show exploded isometric views of the in-wall unit 22 from two different angles. In-wall unit printed circuit board 38 is operatively and electrically connected to the printed circuit board 14 via pogo pin connectors 36, as well as to outlet 32 and center button 34. Ground yoke 40 is provided to mount in-wall unit 22 on the wall via the electrical box with screws 30. Tamper resistant elements 37 may be mounted on the in-wall unit 22 as shown. Slide plug blade sockets 42, 44 may also be provided. Rear housing 26 is adapted to receive the in-wall unit printed circuit board 38. In-wall unit bracket 48 may be provided with a central pocket sized to receive and circumferentially surround the rear housing 26, as shown. FIG. 7 shows in-wall unit chip 39 operatively connected to the in-wall unit for communication with such other elements (wall-mounted panel, relay controls, app on a phone, etc.). Such connection can be via wired assembly or via wireless communication.

The in-wall unit 22 may be appreciated to be another type of in-wall unit, e.g. light switch, dimmer, ethernet box, etc, where the in-wall unit still consists of an in-wall unit printed circuit board 38 with pogo pin connector 36. The in-wall unit 22 may be appreciated without a pogo pin connector 36, the cover plate assembly 11 may be appreciated without a pogo pin connector 17, which the in-wall unit 22 may transmit power to the cover plate assembly 11 via wireless power transmission method.

Persons of ordinary skill in the art, given the benefit of this disclosure, may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An outlet assembly supplied electricity from a power source, the outlet assembly comprising, in combination:

an in-wall unit electrically connected to the power source; and cover plate assembly comprising a front cover, a rear cover, and a printed circuit board;

wherein the in-wall unit assembly has an outlet and an in-wall unit plate extending circumferentially around the outlet and adapted to restrict movement of the outlet toward the rear, with the outlet positioned in front of the in-wall unit plate, and the in-wall unit plate is positioned between the outlet and the rear housing;

wherein the printed circuit board is electrically connected the in-wall unit.

2. The outlet assembly of claim 1, further comprising a bracket operatively connected to the in-wall unit, wherein the bracket is also connected by snap fit connection to the rear cover of the cover plate assembly; and an intermediate bracket positioned between the outlet and the in-wall unit plate.

3. The outlet assembly of claim 1, further comprising a pogo pin connector mounted on an in-wall unit printed circuit board, wherein the pogo pin connector is connected to another pogo pin connector mounted on the printed circuit board of the cover plate assembly.

4. The outlet assembly of claim 1, further comprising an inductive coupler allowing for wireless electrical connection between the in-wall unit and the cover plate assembly.

5. The outlet assembly of claim 1, wherein at least one LED is mounted on the cover plate assembly printed circuit board.

6. The outlet assembly of claim 1, where in at least one microcontroller unit is mounted on the cover plate assembly printed circuit board.

7. The outlet assembly of claim 1, further comprising a ground yoke positioned between the intermediate bracket and the in-wall unit plate;

wherein the front cover of the cover plate assembly circumferentially surrounds the outlet.

8. The outlet assembly of claim 1, further comprising:

a cover plate chip operatively connected to the cover plate printed circuit board.

9. The outlet assembly of claim 1, further comprising:

an in-wall unit chip operatively connected to an in-wall unit printed circuit board.

10. The outlet assembly of claim 7, wherein the outlet is electrically connected to the in-wall unit, and at least one screw secures the intermediate bracket to the in-wall unit plate.

* * * * *